(12) United States Patent
Pandey

(10) Patent No.: US 9,310,461 B2
(45) Date of Patent: Apr. 12, 2016

(54) DETERMINING ACCESS POINT ORIENTATION BASED ON NEIGHBOR ACCESS POINT LOCATIONS

(71) Applicant: Cisco Technology, Inc., San Jose, CA (US)

(72) Inventor: Santosh Pandey, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 455 days.

(21) Appl. No.: 13/835,627

(22) Filed: Mar. 15, 2013

(65) Prior Publication Data

US 2014/0266908 A1  Sep. 18, 2014

(51) Int. Cl.
*G01S 5/02* (2010.01)
*H04W 64/00* (2009.01)

(52) U.S. Cl.
CPC ........... *G01S 5/0247* (2013.01); *H04W 64/006* (2013.01)

(58) Field of Classification Search
CPC .................................... G01S 3/14; G01S 3/74
USPC ......... 342/357.2, 357.68, 417, 442, 437, 445; 324/207.23, 207.25
See application file for complete search history.

(56) References Cited

U.S. PATENT DOCUMENTS

| 5,568,152 | A  | * | 10/1996 | Janky ...................... G01S 19/51 342/357.68 |
| 7,565,169 | B1 |   | 7/2009  | Theobold |
| 2007/0082677 | A1 |   | 4/2007  | Hart et al. |
| 2011/0193554 | A1 | * | 8/2011  | Pavlov ...................... G01V 3/12 324/207.25 |

OTHER PUBLICATIONS

Xiong, Jie et al., SecureAngle: Improving Wireless Security Using Angle-of-Arrival Information (Poster Abstract), Proceedings of the ACM SIGCOMM 2010 Conference on Applications, Technologies, Architectures, and Protocols for Computer Communications, Aug. 2010, pp. 415-416, ACM, New York, United States.
Sheth, Anmol et al., Geo-fencing: Confining Wi-Fi Coverage to Physical Boundaries, Proceedings of the 7th International Conference on Pervasive Computing, May 11, 2009, pp. 274-290, ACM, New York, United States.

* cited by examiner

*Primary Examiner* — Dao Phan
(74) *Attorney, Agent, or Firm* — Patterson & Sheridan, LLP

(57) ABSTRACT

In an example embodiment, the orientation of a wireless device, such as an access point (AP) can be determined based on the location of neighboring wireless devices and the observed angle of arrival of signals from the wireless device at the neighboring wireless devices. For example, the angle of orientation can be determined by comparing an observed angle of arrival with the known actual angle between wireless devices. If a plurality of wireless devices measure the signal, the mean or median of the difference between observed angle of arrival of a signal from the wireless device with the actual angle for the plurality of wireless devices may be employed to determine the angular orientation.

20 Claims, 4 Drawing Sheets

DETERMINING ACCESS POINT ORIENTATION BASED ON NEIGHBOR ACCESS POINT LOCATIONS

TECHNICAL FIELD

The present disclosure relates generally to wireless devices.

BACKGROUND

Administrators of wireless local area networks desire accurate location and orientation of access points (APs). When a new access point (AP) is added to a network, the installer may manually determine the azimuth and elevation angle of the AP. The azimuth and elevation angle of the AP are employed to determine heatmap estimates, location estimation, network coverage estimation, etc.

OVERVIEW OF EXAMPLE EMBODIMENTS

Figure 1:
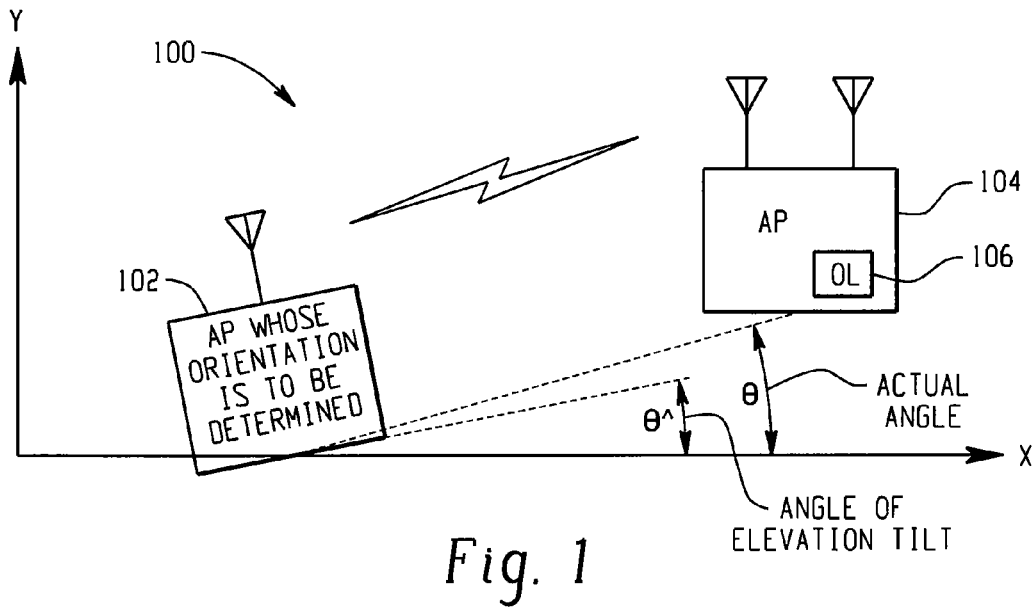
FIG. 1 is a block diagram comprising wireless devices for illustrating an example of determining an angle of orientation of a wireless device from an axis.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein logic encoded in a tangible, non-transitory computer readable media for execution by a processor. The logic when executed is operable to obtain data representative of locations of a plurality of wireless devices, obtain data representative of angle of arrival of a signal from a wireless device whose orientation is to be determined from wireless devices associated with the plurality of wireless devices, and obtain data representative of an actual angle between the wireless device whose orientation is to be determined and wireless devices associated with the plurality of wireless devices. The logic is operable to determine an orientation of the wireless device whose orientation is to be determined based on a difference of angle of arrival and the actual angle between the wireless device whose orientation is to be determined and wireless devices associated with the plurality of wireless devices.

In accordance with an example embodiment, there is disclosed herein, an apparatus comprising an interface for receiving data; and a controller. The controller comprises orientation logic for determining an orientation of the wireless device whose orientation is to be determined. The controller is operable to obtain data representative of a location of a wireless device. The controller is operable to obtain, via the interface, data representative of angle of arrival of a signal from the wireless device whose orientation is to be determined from the wireless device. The controller is operable to obtain data representative of an actual angle between the wireless device whose orientation is to be determined and the wireless device. The controller is operable to determine an orientation of the wireless device whose orientation is to be determined with respect to a predefined axis based on a difference of angle of arrival and the actual angle between the wireless device whose orientation is to be determined and the wireless device.

In accordance with an example embodiment, there is disclosed herein a method comprising obtaining data representative of a location for a plurality of wireless devices, obtaining data representative of an actual angle between the wireless device whose orientation is to be determined and wireless devices belonging to the plurality of wireless devices, and obtaining data representative of an angle of arrival of a signal from the wireless device whose orientation is to be determined from wireless devices belonging to the plurality of wireless devices. A heat map is generated for a predefined grid around wireless devices belonging to the plurality of wireless devices, the heat maps comprise data representative of phase angles for a signal received from predefined points on the grid for a plurality of antennas associated with the wireless devices belonging to the plurality of wireless devices. The method further comprises determining a likelihood (probability) that a signal came from predefined angles of arrival for the wireless devices belong to the plurality of wireless devices, and determining, by the processor, an aggregate likelihood for predefined angles of orientation. The angle with the highest likelihood is selected as the angle of orientation.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

FIG. 1 is a block diagram 100 comprising wireless devices (which in this example are APs but the principles described herein can be applied to any suitable wireless devices) 102, 104 for illustrating an example of determining an angle of orientation ($\Theta\hat{}$), or azimuth, of a wireless device from an axis (in the illustrated example from the X axis although the principles described herein can be employed on any axis or coordinate system). In this example, the locations of APs 102 and 104 are known, the angle of orientation for wireless device 102 is to be determined.

For this example, logic 106 in AP 104 determines the azimuth ($\Theta\hat{}$), however, the logic 106 may physically be located anywhere that is communicatively coupled with AP 104. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

Because the locations of APs 102 and 104 are known, the actual angle ($\Theta$) between them can be computed. For example, data representative of the locations of APs 102, 104, and optionally the actual angle ($\Theta$) may be provided to AP 104 by a location server (not shown) or input via a user interface (not shown). In particular embodiments, the logic 106 in AP 104 computes the actual angle ($\Theta$).

In an example embodiment, AP 104 obtains an angle of arrival (AOA) of a signal sent from AP 102. The AOA may include an azimuth and/or elevation tilt reading (which will be described in further detail in FIG. 3 herein). The logic 106 determines the orientation ($\Theta\hat{}$) of the wireless device 102 based on a difference of angle of arrival and the actual angle ($\Theta$), (or $\Theta\hat{}-\Theta$), between the AP 102 and the AP 104. In an example embodiment, the elevation of the APs 102 and 104 are assumed to be equal.

Figure 2:
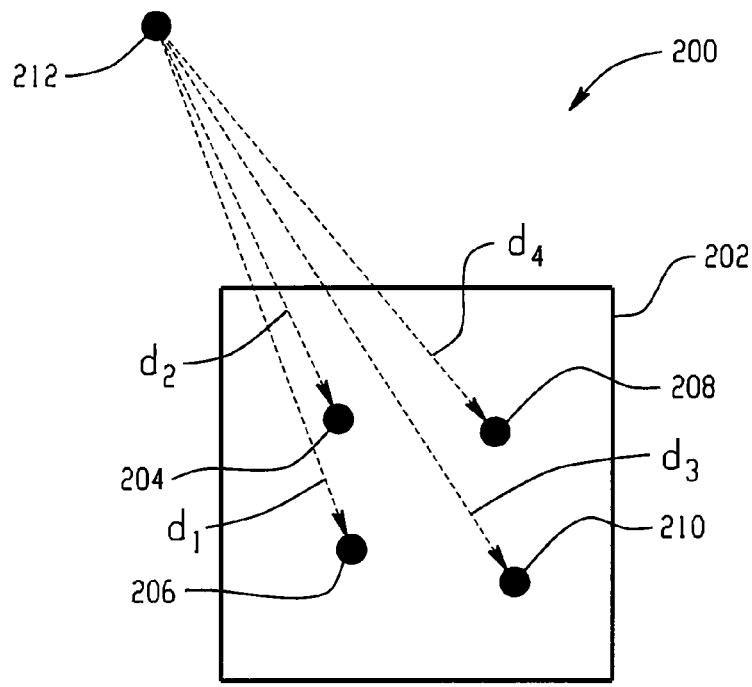
FIG. 2 illustrates an example of a heat map for determining angle of arrival.

In an example embodiment, a heat map may be employed to determine the phase difference of a signal between antennas for computing the angle of arrival. FIG. 2 illustrates an example of a heat map 200 for a wireless device 202 having four antennas 204, 206, 208, 210. Although the example illustrated in FIG. 2 illustrates four antennas, those skilled in the art should readily appreciate that the principles described herein are applicable to any physically realizable number of antennas.

The heat map 200 comprises a grid with known distances of separation between grid points (which are located at the intersection of the grid lines). For example, a distance of one foot in the X and Y directions may be employed. Although the example illustrated in FIG. 2 is a square grid, those skilled in the art should readily appreciate that any suitable shape (e.g., rectangular) may be employed.

In the illustrated example, a calculation is made for the phase of a signal originating from grid point 212, where distance d1 is the distance between the grid point 212 and antenna 206, distance d2 is the distance between the grid point 212 and antenna 204, d3 is the distance between the grid point 212 and antenna 210, and d4 is the distance between the grid point 212 and antenna 208.

The phase ($\phi$) in degrees for the antennas 204, 206, 208, 210 from the grid point 212 to an antenna can be calculated as mod(distance, wavelength ($\lambda$))/$\lambda$*360, where mod is the modulo function. So the phase for antenna 204 is mod(d2, $\lambda$)/$\lambda$*360; for antenna 206, mod(d1, $\lambda$)/$\lambda$*360; for antenna 208, mod(d4, $\lambda$)/$\lambda$*360; and for antenna 210, mod(d3, $\lambda$)/$\lambda$*360.

Once the phase ($\phi$) is computed for the antennas, the phase difference ($\phi_{diff}$) can be computed for any pair of antennas. For example, the phase difference ($\phi_{diff}$) can be computed for antennas 204 and 206, antennas 204 and 208, antennas 204 and 210, antennas 206 and 208, antennas 206 and 210, and antennas 208 and 210.

In an example embodiment, the orientation logic 106 compares the phase difference of the signal received from a wireless device whose orientation is to be determined with the heat map to determine the angle of arrival of the signal. In particular embodiments, a likelihood (probability) that a signal came from a predefined grid point for the grid points in the heat map is determined and/or a likelihood for predefined angles of rotation about the axis (e.g., one degree intervals) are computed for antenna pairs. The likelihood for the antenna pairs are summed, and the angle with the highest summed likelihood is selected as the angle of arrival.

For example, the likelihood that a phase is from a grid point (e.g., grid point 202) can be calculated as −log(tt1−tt2), where tt1 is the calculated phase difference from the heat map, and tt2 is the observed phase difference for the antenna pair. Because phase is cyclic, three hundred and sixty degrees should be added to any negative results. The likelihoods for antenna pairs are summed for a grid point to create an aggregate matrix. In particular embodiments, likelihoods may also be aggregated across radial angles of rotation about the axis (e.g., one degree intervals). The angle of arrival is determined to be the angle with the maximum likelihood.

Figure 3:
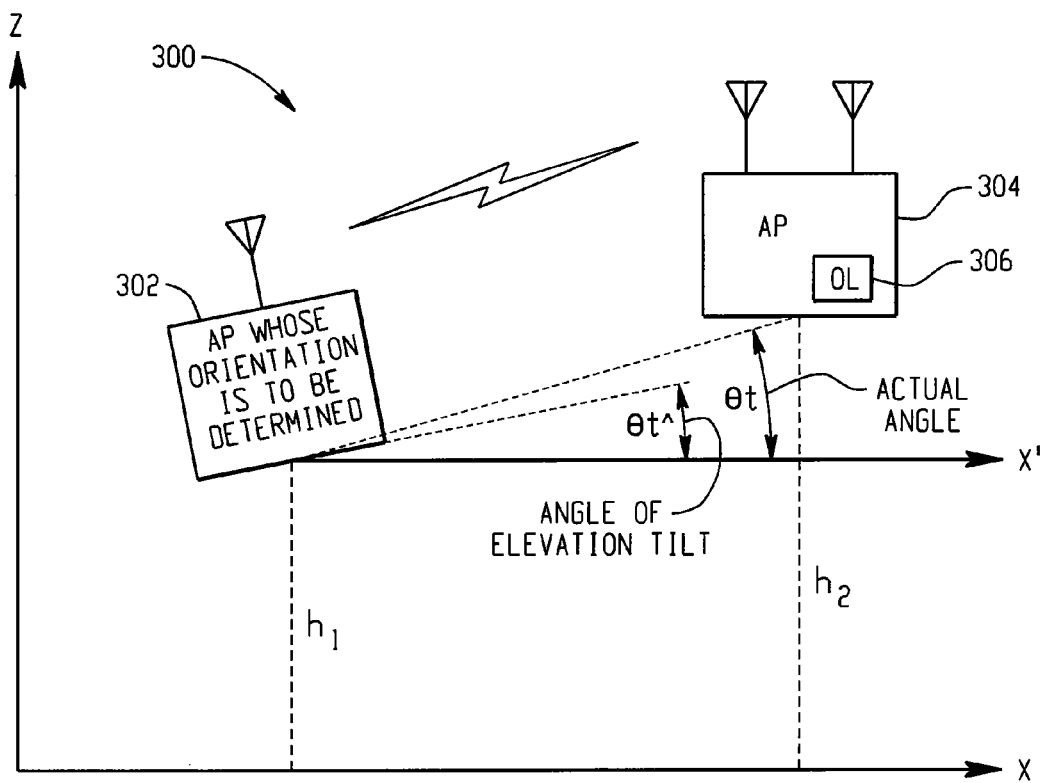
FIG. 3 is a block diagram comprising wireless devices for illustrating an example of determining an elevation tilt angle for a wireless device.

FIG. 3 is a block diagram 300 comprising wireless devices for illustrating an example of determining an elevation tilt angle ($\Theta t\hat{}$) for a wireless device. The actual angle ($\Theta t$) between AP 302 and AP 304 is known or can be calculated based on h1 and h2. In an example embodiment, the antennas whose AOA measurements are used for determining the elevation tilt angle ($\Theta t\hat{}$) are at different heights. In the illustrated example embodiment, the elevation tilt angle ($\Theta t\hat{}$) is computed by logic 306 in AP 304, however, those skilled in the art should readily appreciate that the logic for computing the elevation tilt angle ($\Theta t\hat{}$) can be located anywhere that can obtain the appropriate data.

In an example embodiment, AP 304 obtains an angle of arrival (AOA) of a signal sent from AP 302. The AOA comprises an elevation tilt reading, but may include an azimuth reading. The logic 306 determines the orientation ($\Theta t\hat{}$) of the AP 302 based on a difference of angle of arrival and the actual angle ($\Theta$), (or $\Theta\hat{}-\Theta$), between the AP 302 and the AP 304. In an example embodiment, the azimuth of APs 302 and 304 are assumed to be equal.

In an example embodiment, a heat map may be employed to determine the phase difference of a signal between antennas for computing the angle of arrival. For example, a heat map similar to the heat map illustrated in FIG. 2 may be constructed for the X-Z plane, and the AOA for the elevation tilt angle may be determined as described in FIG. 2.

Figure 4:
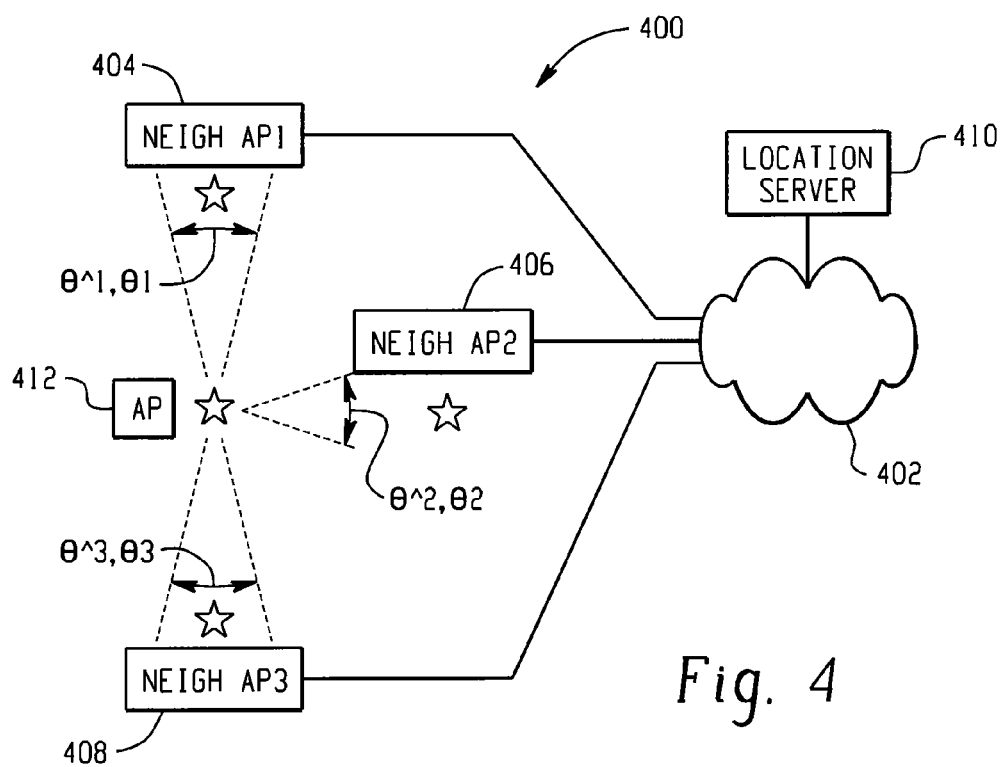
FIG. 4 is a block diagram of an example of a network comprising a plurality of wireless devices for illustrating an example of determining an angle of orientation of a wireless device from an axis based on data obtained from the plurality of wireless devices.

FIG. 4 is a block diagram of an example 400 of a network comprising a plurality of wireless devices 404, 406, 408 for illustrating an example of determining an angle of orientation ($\Theta\hat{}$) of a wireless device 412 from an axis based on data obtained from the plurality of wireless devices 404, 406, 408. In the illustrated example, a location server 410 is employed to calculate the angle of orientation (Θ^) of wireless device 412, however, those skilled in the art can readily appreciate the logic for computing the angle of orientation (Θ^) for the wireless device 412 may be embodied in any suitable infrastructure node, such as, for example, in a wireless switch, wireless LAN (local area network) controller, etc. The location server 410 is communicatively coupled with APs 404, 406, 408 via network 402. Moreover, for ease of illustration, access points (APs) are employed for the illustrated example, however, those skilled in the art should readily appreciate that the principles described herein may be suitably employed by any type of wireless device.

In the illustrated example, the actual angles between AP 404 and AP 412 (Θ1), AP 406 and AP 412 (Θ2), and 408 and AP 412 (Θ3) are known and/or can be calculated based on known locations of APs 404, 406, 408, and 412. For example, location server 410 can obtain the locations of APs 404, 406, 408, and 412 via a user interface (not shown) and/or can determine their locations based on signals obtained from wireless devices at known locations (e.g., using signal strength, such as, for example, received signal strength indication "RSSI" and/or AOA). The location server 410 obtains data representative of the angle of arrival (Θ^1) from AP 404, data representative of the angle of arrival (Θ^2) from AP 406, and data representative of the angle of arrival (Θ^3) from AP 408. The data representative of angle of arrival received from AP 404, AP 406, and AP 408, Θ^1, Θ^2, and Θ^3 respectively, may suitably comprise data representative of an angle of arrival computed by the AP, and/or data representative of a phase difference measured by the AP's antennas. In an example embodiment, the elevation of APs 404, 406, 408, and 412 are assumed to be equal when computing the azimuth.

In an example embodiment, the azimuth is estimated as the mean of the differences between the measured angles (Θ^X) actual angles (ΘX). For example the mean of (Θ^1)−(Θ1), (Θ^2)−(Θ2), and (Θ^3)−(Θ3). In another example embodiment, the azimuth is determined by the median of the differences between the measured and computed angles, e.g., median ((Θ^1)−(Θ1), (Θ^2)−(Θ^2), and (Θ^3)−(Θ3)).

In an example embodiment, the orientation of the wireless device 412 is based on a weighted average of the difference between angle of arrival and actual angle for the plurality of wireless devices. In an example embodiment, a weighted average can be based on the RSSI (Received Signal Strength Indication) of the signals used to calculate the phases. For example if the RSSI used to calculate the phase Θ1 is greater than the one used to calculate the phase Θ2 then the Θ^1−Θ1 can be given more weight than Θ^2−Θ2. The weighting factor for an angle Θ_i can be calculated as (rssi_i/sum(RSSI))

In an example embodiment, a heat map is generated for APs 404, 406, and 408. For example, a heat map as described herein for FIG. 2 is generated and employed to determine the angle of arrival Θ^1, Θ^2, and Θ^3 for APs 404, 406, and 408 respectively.

In an example embodiment, a probability (likelihood) can be calculated for angles of rotation around the axis (for example, one degree or any desired intervals) for a plurality of wireless devices to determine the azimuth and/or elevation tilt angle. For example, for one degree of rotation, Θ^1 for one degree of rotation, Θ^2 for one degree of rotation, and Θ^3 for one degree of rotation can be computed and compared with Θ^1, Θ^2, and Θ^3 respectively to determine a likelihood (probability) that the AOA measured at by the APs (AP 404, AP 406, and AP 408) corresponds to one degree of rotation. The probabilities for the APs (AP 404, AP 406, and AP 408) can be summed. The computation can be repeated for other desired angles of rotation, and the angle of rotation with the highest sum is selected as the azimuth and/or elevation tilt angle.

Figure 5:
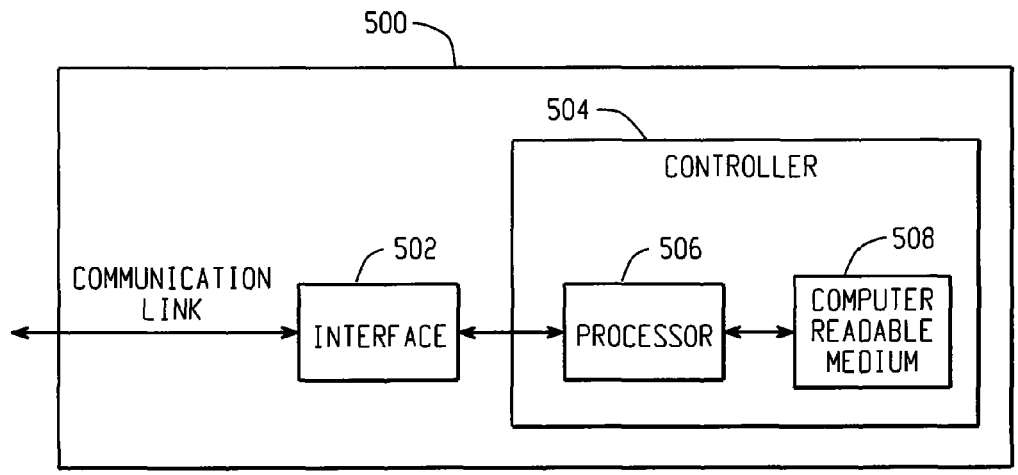
FIG. 5 is a block diagram of an apparatus for determining an angle of orientation and/or elevation tilt angle of a wireless device.

FIG. 5 is a block diagram of an apparatus 500 for determining an angle of orientation and/or elevation tilt angle of a wireless device. Apparatus 500 is suitable for implementing the functionality of orientation logic 106 in FIG. 1, orientation logic 306 in FIG. 3, and/or location server 410 in FIG. 4.

In an example embodiment, the apparatus 500 comprises an interface 502 coupled with a communication link. The controller 504 is coupled with the interface 502 and is able to receive data from the communication link via the interface 502. Controller 504 comprises a processor 506 coupled with a computer readable medium 508.

An aspect of the example embodiment is related to the use of controller 504 for determination of a wireless device's angular orientation. According to an example embodiment, determining the wireless device's angular orientation is provided by controller 504 in response to processor 506 executing one or more sequences of one or more instructions contained in the computer readable medium 508. Execution of the instructions contained in the computer readable medium 508 causes processor 506 to perform the functionality described herein. One or more processors in a multi-processing arrangement may also be employed to execute the instructions contained in computer readable medium 508. In alternative embodiments, hard-wired circuitry may be used in place of or in combination with software instructions to implement an example embodiment. Thus, the example embodiments described herein are not limited to any specific combination of hardware circuitry and software.

The term "computer-readable medium" as used herein refers to any medium that participates in providing instructions to processor 506 for execution. Such a medium may take many forms, including but not limited to non-volatile media, and volatile media. Non-volatile media include for example optical or magnetic disks. Volatile media include dynamic memory, such as a Read Only Memory (ROM) and/or a Random Access Memory ("RAM") which in particular embodiments can be a read/write memory. As used herein, tangible media may include any non-transitory media such as a volatile and non-volatile media. Common forms of computer-readable media include, for example, floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

In an example embodiment, controller 504 is operable to obtain data representative of a location of a wireless device. The controller 504 obtains data representative of angle of arrival of a signal from a wireless device whose orientation is to be determined from the wireless device. The controller 504 also obtains data representative of an actual angle between the wireless device whose orientation is to be determined and the wireless device. The controller 504 determines an orientation (azimuth angle) of the wireless device whose orientation is to be determined based on a difference of angle of arrival and the actual angle between the wireless device whose orientation is to be determined and the wireless device. In an example embodiment, the controller 504 is further operable to determine an elevation tilt angle between the wireless device whose orientation is to be determined and wireless devices associated with the plurality of wireless devices.

In an example embodiment, the controller 504 obtains data representative of location for a plurality of wireless devices.

The data representative of angle of arrival of the signal from the wireless device whose orientation is to be determined is obtained from the plurality of wireless devices, and data representative of an actual angle between the wireless device whose orientation is to be determined and the plurality of wireless devices is obtained. The controller 504 determines the orientation of the wireless device whose orientation is to be determined is based on a difference of angle of arrival and the actual angle for the plurality of wireless devices. In particular embodiments, the orientation of the wireless device whose orientation is to be determined is based on a mean of the difference between angle of arrival and actual angle for the plurality of wireless devices. In other particular embodiments, the orientation of the wireless device whose orientation is to be determined is based on a weighted average of the difference between angle of arrival and actual angle for the plurality of wireless devices. In yet other particular embodiments, the orientation of the wireless device whose orientation is to be determined is based on a median of the difference between angle of arrival and actual angle for the plurality of wireless devices. In an example embodiment, the controller 504 assumes that the elevation of the wireless device whose orientation is to be determined and the plurality of wireless devices are assumed to be equal.

In an example embodiment, the controller 504 generates a heat map for a predefined grid around one or more wireless devices. The heat maps comprise data representative of phase angles for a signal received from predefined points on the grid for a plurality of antennas associated with the wireless devices belonging to the plurality of wireless devices.

In an example embodiment, the controller 504 is operable to compare a phase difference of the signal received from a wireless device whose orientation is to be determined with the heat map to determine the angle of arrival of the signal. In particular embodiments, the controller 504 determines a likelihood that a signal came from a predefined grid point for the grid points in the heat map and selects an angle or arrival corresponding to the grid point with the highest likelihood.

In an example embodiment, the controller 504 determines a likelihood that a signal came from predefined angles of arrival for a plurality of wireless devices. The controller 504 selects an angle of arrival corresponding to the angle with the highest likelihood for wireless devices belonging to the plurality of wireless devices. The controller 504 determines an aggregate likelihood for predefined angles of orientation and selects an angle with the highest aggregated likelihood as the angle of orientation.

Figure 6:
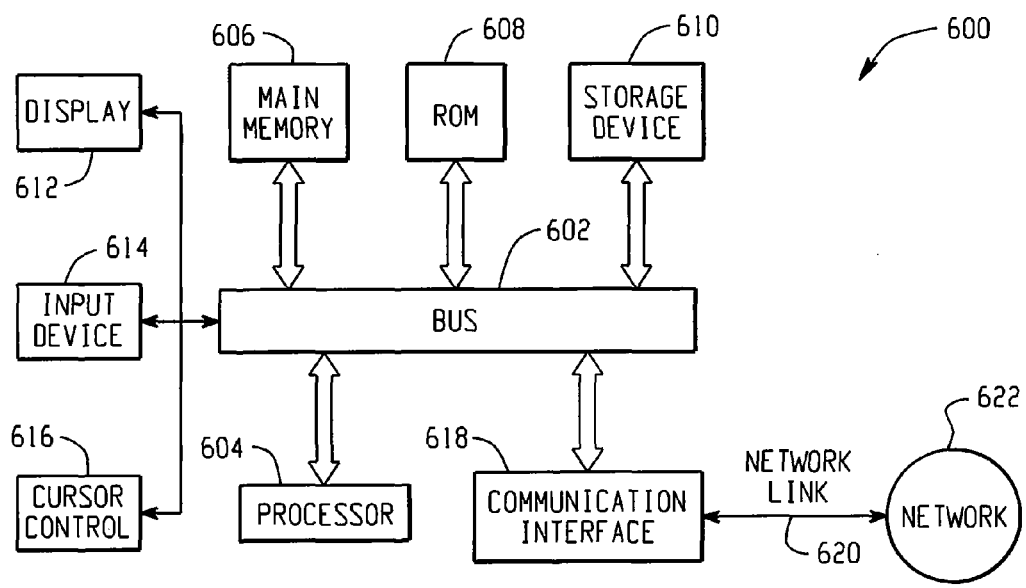
FIG. 6 is block diagram of a computer system upon which an example embodiment can be implemented.

FIG. 6 is block diagram of a computer system 600 upon which an example embodiment can be implemented. Computer system 600 may be employed for implementing the functionality of orientation logic 106 described in FIG. 1, orientation logic 306 described in FIG. 3, location server 410 described in FIG. 4 and/or controller 504 described in FIG. 5.

Computer system 600 includes a bus 602 or other communication mechanism for communicating information and a processor 604 coupled with bus 602 for processing information. Computer system 600 also includes a main memory 606, such as random access memory (RAM) or other dynamic storage device coupled to bus 602 for storing information and instructions to be executed by processor 604. Main memory 606 also may be used for storing a temporary variable or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, optical disk, and/or flash storage, is provided and coupled to bus 602 for storing information and instructions.

Computer system 600 may be coupled via bus 602 to a display 612 such as a cathode ray tube (CRT) or liquid crystal display (LCD), and/or Light Emitting Diode (LED) display for displaying information to a computer user. An input device 614, such as a keyboard including alphanumeric and other keys is coupled to bus 602 for communicating information and command selections to processor 604. Another type of user input device is cursor control 616, such as a mouse, a trackball, cursor direction keys, and/or a touchscreen for communicating direction information and command selections to processor 604 and for controlling cursor movement on display 612. This input device typically has two degrees of freedom in two axes, a first axis (e.g., x) and a second axis (e.g., y) that allows the device to specify positions in a plane. Input device 614 may be employed for obtaining data representative of a location of known wireless devices, and optionally the actual angle between the known wireless devices and a wireless device whose angular orientation is to be determined.

An aspect of the example embodiment is related to the use of computer system 600 for determining angular orientation of a wireless device. According to an example embodiment, determining angular orientation is provided by computer system 600 in response to processor 604 executing one or more sequences of one or more instructions contained in main memory 606. Such instructions may be read into main memory 606 from another computer-readable medium, such as storage device 610. Execution of the sequence of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement an example embodiment. Thus, embodiments described herein are not limited to any specific combination of hardware circuitry and software.

Computer system 600 also includes a communication interface 618 coupled to bus 602. Communication interface 618 provides a two-way data communication coupling computer system 600 to a communication (in this example a network) link 620 that is connected to a local network 622. For example, communication interface 618 may be a local area network (LAN) card to provide a data communication connection to a compatible LAN. As another example, communication interface 618 may be an integrated services digital network (ISDN) card or a modem to provide a data communication connection to a corresponding type of telephone line. Wireless links may also be implemented. In any such implementation, communication interface 618 sends and receives electrical, electromagnetic, or optical signals that carry digital data streams representing various types of information.

In view of the foregoing structural and functional features described above, methodologies in accordance with an example embodiments will be better appreciated with reference to FIGS. 7-10. While, for purposes of simplicity of explanation, the methodologies of FIGS. 7-10 are shown and described as executing serially, it is to be understood and appreciated that the example embodiments are not limited by the illustrated orders, as some aspects could occur in different orders and/or concurrently with other aspects from that shown and described herein. Moreover, not all illustrated features may be required to implement the methodologies.

The methodologies described herein are suitably adapted to be implemented in hardware, software, or a combination thereof.

Figure 7:
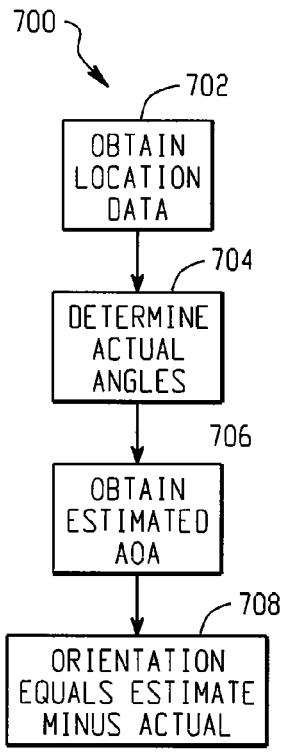
FIG. 7 is an example of a methodology for computing an angle of orientation based on a difference between a measured angle of arrival and an actual angle between wireless devices.

FIG. 7 is an example of a methodology 700 for computing an angle of orientation based on a difference between a measured angle of arrival and an actual angle between wireless devices. Methodology 700 may be implemented by AP 104 (FIG. 1), AP 304 (FIG. 3), location server 410 (FIG. 4), controller 504 (FIG. 5) and/or computer system 600 (FIG. 6).

At 702, data representative of the location data for wireless devices is obtained. The location data may be obtained via a user interface. For some devices, the location may be calculated based on the signal strength (e.g., "RSSI") and/or AOA of signals received by devices at known locations.

At 704, data representative of the actual angles between known wireless devices and the wireless device whose angular rotation is to be determined is obtained. In an example embodiment, the angles may be obtained via a user interface. In another example embodiment, the actual angles are received from another device, such as, for example, a location server. In yet another example embodiment, the actual angle is determined based on the location of the device whose angular orientation is to be determined and the known locations of the device or devices receiving a signal from the device whose angular orientation is to be determined.

At 706, data representative of an angle of arrival (AOA) is obtained. The AOA may include an azimuth and/or elevation tilt reading.

In an example embodiment, a heat map may be employed to determine the phase difference of a signal between antennas for computing the angle of arrival. For example FIG. 2 illustrates an example of a heat map 200.

The heat map 200 comprises a grid with known distances of separation between grid points (which are located at the intersection of the grid lines). For example, a distance of one foot in the X and Y directions may be employed. Although the example illustrated in FIG. 2 is a square grid, those skilled in the art should readily appreciate that any suitable shape (e.g., rectangular) may be employed.

A phase is computed from a reference point for a plurality of antennas associated with the device receiving a signal from the device whose orientation is to be determined. Once the phase ($\phi$) is computed for the antennas, the phase difference ($\phi_{diff}$) can be computed for any pair of antennas. For example, in FIG. 2 the phase difference ($\phi_{diff}$) can be computed for antennas 204 and 206, antennas 204 and 208, antennas 204 and 210, antennas 206 and 208, antennas 206 and 210, and antennas 208 and 210. As described herein, the phase difference of the signal received from the wireless device whose orientation is to be determined is compared with the phase differences calculated from the heat map to determine an angle of arrival. In particular embodiments, the probability (likelihood) for various angles of arrival are computed and the angle of arrival with the highest probability is selected as the angle of arrival.

At 708, the orientation (azimuth and/or elevation tilt) angle is computed. In an example embodiment, the azimuth is estimated as the mean of the differences between the measured angles ($\Theta\hat{}$) actual angles ($\Theta X$). For example, for measurements received from three devices, the angle of orientation would be the mean of ($\Theta\hat{}1$)–($\Theta 1$), ($\Theta\hat{}2$)–($\Theta 2$), and ($\Theta\hat{}3$)–($\Theta 3$). In another example embodiment, the azimuth is determined by the median of the differences between the measured and computed angles, e.g., median (($\Theta\hat{}1$)–($\Theta 1$), ($\Theta\hat{}2$)–($\Theta 2$), and ($\Theta\hat{}3$)–($\Theta 3$)). In yet another example embodiment, a probability (likelihood) can be calculated for angles of rotation around the axis (for example, one degree or any desired intervals) for a plurality of wireless devices to determine the azimuth and/or elevation tilt angle. The probabilities for an angle of rotation can be aggregated (summed), and the angle with the highest aggregated probability is selected as the angle of orientation.

Figure 8:
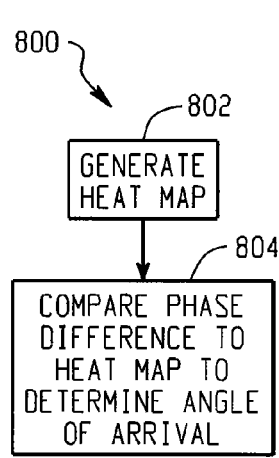
FIG. 8 is an example of a methodology for determining an angle of arrival using a heat map for calculating phase differences between antennas.

FIG. 8 is an example of a methodology 800 for determining an angle of arrival using a heat map for calculating phase differences between antennas. Methodology 800 may be implemented by AP 104 (FIG. 1), AP 304 (FIG. 3), location server 410 (FIG. 4), controller 504 (FIG. 5) and/or computer system 600 (FIG. 6).

At 802, a heat map is generated. The heat map comprises a grid with known distances of separation between grid points (which are located at the intersection of the grid lines). For example, a distance of one foot in the X and Y directions may be employed. Any suitable shape (e.g., square, rectangular, etc.) may be employed for the heat map.

A calculation is made for the phase of a signal originating from grid points on the heat map and antennas associated with the wireless device that received the signal from the device whose angular orientation is to be determined. The phase ($\phi$) in degrees for an antennas from the grid point to an antenna can be calculated as mod(distance, wavelength ($\lambda$))/$\lambda$*360, where mod is the modulo function. Once the phase ($\phi$) is computed for the antennas, the phase difference ($\phi_{diff}$) can be computed for any pair of antennas.

At 804, the phase difference of the signal received from a wireless device whose orientation is to be determined is compared with calculated phase differences from the heat map to determine the angle of arrival of the signal. The best match is selected as the angle of arrival. As will be described herein in FIG. 9, a probability function may be employed to select the angle of arrival.

Figure 9:
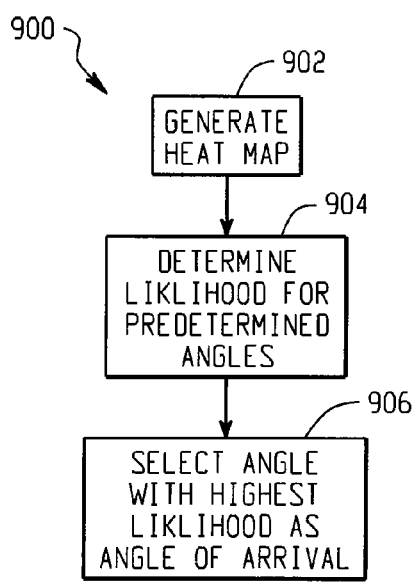
FIG. 9 is an example of a methodology for determining an angle of arrival using a heat map and determining a likelihood for a predefined plurality of angles.

FIG. 9 is an example of a methodology 900 for determining an angle of arrival using a heat map and determining a likelihood for a predefined plurality of angles. Methodology 900 may be implemented by AP 104 (FIG. 1), AP 304 (FIG. 3), location server 410 (FIG. 4), controller 504 (FIG. 5) and/or computer system 600 (FIG. 6).

At 902, a heat map is generated. The heat map comprises a grid with known distances of separation between grid points (which are located at the intersection of the grid lines). For example, a distance of one foot in the X and Y directions may be employed. Any suitable shape (e.g., square, rectangular, etc.) may be employed for the heat map.

A calculation is made for the phase of a signal originating from grid points on the heat map and antennas associated with the wireless device that received the signal from the device whose angular orientation is to be determined. The phase ($\phi$) in degrees for an antennas from the grid point to an antenna can be calculated as mod(distance, wavelength ($\lambda$))/$\lambda$*360, where mod is the modulo function. Once the phase ($\phi$) is computed for the antennas, the phase difference ($\phi_{diff}$) can be computed for any pair of antennas.

At 904, a likelihood (probability) that a signal came from a predefined grid point for the grid points in the heat is determined and/or a likelihood for predefined angles of rotation about the axis (e.g., one degree intervals) are computed for antenna pairs. The likelihood for the antenna pairs are summed, and the angle with the highest summed likelihood is selected as the angle of arrival.

For example, the likelihood that a phase is from a grid point (e.g., grid point 202) can be calculated as –log(tt1–tt2), where tt1 is the calculated phase difference from the heat map, and tt2 is the observed phase difference for the antenna pair. Because phase is cyclic, three hundred and sixty degrees should be added to any negative results. The likelihoods for antenna pairs are summed for a grid point to create an aggregate matrix. In particular embodiments, likelihoods may also be aggregated across radial angles of rotation about the axis (e.g., one degree intervals).

At 906, the angle of arrival is selected. In an example embodiment, the angle of arrival is determined to be the angle with the maximum likelihood.

Figure 10:
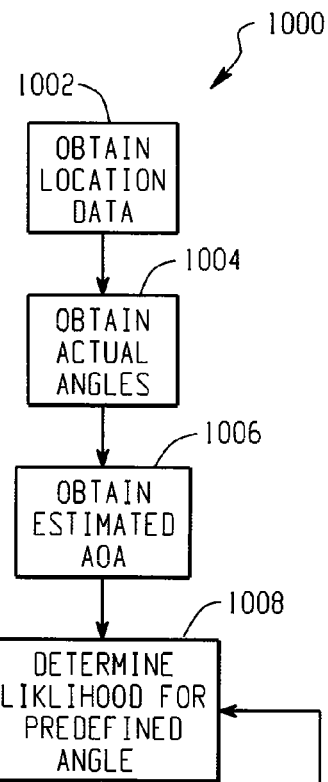
FIG. 10 is an example of a methodology for determining an angle of orientation that employs an aggregate likelihood from a plurality of wireless devices.

FIG. 10 is an example of a methodology 1000 for determining an angle of orientation that employs an aggregate likelihood from a plurality of wireless devices. Methodology 1000 may be implemented by AP 104 (FIG. 1), AP 304 (FIG. 3), location server 410 (FIG. 4), controller 504 (FIG. 5) and/or computer system 600 (FIG. 6).

At 1002, data representative of the location data for wireless devices is obtained. The location data may be obtained via a user interface. For some devices, the location may be calculated based on the signal strength (e.g., "RSSI") and/or AOA of signals received by devices at known locations.

At 1004, data representative of the actual angles between known wireless devices and the wireless device whose angular rotation is to be determined is obtained. In an example embodiment, the angles may be obtained via a user interface. In another example embodiment, the actual angles are received from another device, such as, for example, a location server. In yet another example embodiment, the actual angle is determined based on the location of the device whose angular orientation is to be determined and the known locations of the device or devices receiving a signal from the device whose angular orientation is to be determined.

At 1006, data representative of an angle of arrival (AOA) is obtained. The AOA may include an azimuth and/or elevation tilt reading.

In an example embodiment, a heat map may be employed to determine the phase difference of a signal between antennas for computing the angle of arrival. For example FIG. 2 illustrates an example of a heat map 200.

The heat map 200 comprises a grid with known distances of separation between grid points (which are located at the intersection of the grid lines). For example, a distance of one foot in the X and Y directions may be employed. Although the example illustrated in FIG. 2 is a square grid, those skilled in the art should readily appreciate that any suitable shape (e.g., rectangular) may be employed.

A phase is computed from a reference point for a plurality of antennas associated with the device receiving a signal from the device whose orientation is to be determined. Once the phase ($\phi$) is computed for the antennas, the phase difference ($\phi_{diff}$) can be computed for any pair of antennas. For example, in FIG. 2 the phase difference ($\phi_{diff}$) can be computed for antennas 204 and 206, antennas 204 and 208, antennas 204 and 210, antennas 206 and 208, antennas 206 and 210, and antennas 208 and 210. As described herein, the phase difference of the signal received from the wireless device whose orientation is to be determined is compared with the phase differences calculated from the heat map to determine an angle of arrival. In particular embodiments, the probability (likelihood) for various angles of arrival are computed and the angle of arrival with the highest probability is selected as the angle of arrival.

At 1008, the likelihood that a signal from the wireless device whose orientation is to be determined is calculated for a predetermined angular displacement (rotation). A likelihood (probability) is calculated for a plurality of wireless devices that received a signal from the wireless device whose orientation is to be determined. At 1010, the likelihood (probability) for the plurality of devices receiving the signal are summed.

At 1012, a determination is made whether calculations should be performed for additional angular displacements. If there are additional angular rotations to be calculated (YES), 1010 is repeated for the next angular rotation. If there are no more angular rotations to be calculated (NO), at 1014, the angular rotation (angle) with the highest likelihood (summed likelihoods from the plurality of wireless devices receiving the signal from the wireless device whose angular rotation is to be determined is selected.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. Logic encoded in a tangible, non-transitory computer readable media for execution by a processor, and when executed, the logic is operable to:
   obtain data representative of a location of a wireless device;
   obtain data representative of an angle of arrival of a signal from a wireless device whose orientation is to be determined from the wireless device;
   obtain data representative of an actual angle between the wireless device whose orientation is to be determined and the wireless device; and
   determine an orientation of the wireless device whose orientation is to be determined based on a difference of the angle of arrival and the actual angle between the wireless device whose orientation is to be determined and the wireless device.

2. The logic set forth in claim 1, wherein data representative of respective locations for a plurality of wireless devices is obtained;
   wherein data representative of a plurality of angles of arrival of the signal from the wireless device whose orientation is to be determined is obtained from the plurality of wireless devices;
   wherein data representative of respective actual angles between the wireless device whose orientation is to be determined and the plurality of wireless devices is obtained; and
   wherein the orientation of the wireless device whose orientation is to be determined is based on a difference of the angles of arrival and the actual angles for the plurality of wireless devices.

3. The logic set forth in claim 2, wherein the orientation of the wireless device whose orientation is to be determined is based on a mean of the difference between the angles of arrival and the actual angles for the plurality of wireless devices.

4. The logic set forth in claim 2, wherein the orientation of the wireless device whose orientation is to be determined is based on a weighted average of the difference between the angles of arrival and the actual angles for the plurality of wireless devices.

5. The logic set forth in claim 2, wherein the orientation of the wireless device whose orientation is to be determined is based on a median of the difference between the angles of arrival and the actual angles for the plurality of wireless devices.

6. The logic set forth in claim 2, wherein the elevation of the wireless device whose orientation is to be determined and the plurality of wireless devices are assumed to be equal.

7. The logic set forth in claim 2, further operable to:
generate a heat map for a predefined grid around wireless devices belonging to the plurality of wireless devices, the heat map comprises data representative of phase angles for a signal received from predefined points on the grid for a plurality of antennas associated with the wireless devices belonging to the plurality of wireless devices;
determine a likelihood that a signal came from predefined angles of arrival for the wireless devices belonging to the plurality of wireless devices;
select a first angle corresponding to an angle with the highest likelihood for wireless devices belonging to the plurality of wireless devices;
determine an aggregated likelihood for predefined angles of orientation; and
select an angle with the highest aggregated likelihood.

8. The logic set forth in claim 1, further operable to determine an elevation tilt angle between the wireless device whose orientation is to be determined and wireless devices associated with the plurality of wireless devices.

9. The logic set forth in claim 1, further operable to:
generate a heat map for a predefined grid around the wireless device, the heat map comprises data representative of phase angles for a signal received from points on the grid for a plurality of antennas associated with the wireless device; and
compare a phase difference of the signal received from a wireless device whose orientation is to be determined with the heat map to determine the angle of arrival of the signal.

10. The logic set forth in claim 1, further operable to:
generate a heat map for a predefined grid around the wireless device, the heat map comprises data representative of phase angles for a signal received from points on the grid for a plurality of antennas associated with the wireless device;
determine a likelihood that a signal came from a predefined grid point for the grid points in the heat map; and
select an angle corresponding to the grid point with the highest likelihood as the angle of arrival.

11. An apparatus, comprising:
an interface for receiving data; and
a controller, the controller comprises orientation logic for determining an orientation of the wireless device whose orientation is to be determined;
the controller is operable to obtain data representative of a location of a wireless device;
the controller is operable to obtain via the interface, data representative of an angle of arrival of a signal from the wireless device whose orientation is to be determined from the wireless device;
the controller is operable to obtain data representative of an actual angle between the wireless device whose orientation is to be determined and the wireless device; and
the controller is operable to determine an orientation of the wireless device whose orientation is to be determined with respect to a predefined axis based on a difference of the angle of arrival and the actual angle between the wireless device whose orientation is to be determined and the wireless device.

12. The apparatus set forth in claim 11, wherein data representative of respective locations for a plurality of wireless devices is obtained;
wherein data representative of a plurality of angles of arrival of the signal from the wireless device whose orientation is to be determined is obtained from the plurality of wireless devices;
wherein data representative of respective actual angles between the wireless device whose orientation is to be determined and the plurality of wireless devices is obtained; and
the controller is further operable to determine the orientation of the wireless device whose orientation is to be determined is based on a difference of the angles of arrival and the actual angles for the plurality of wireless devices.

13. The apparatus set forth in claim 12, the controller is further operable to generate a heat map for a predefined grid around wireless devices belonging to the plurality of wireless device, the heat map comprises data representative of phase angles for a signal received from predefined points on the grid for a plurality of antennas associated with the wireless devices belonging to the plurality of wireless devices;
the controller is operable to determine a likelihood that a signal came from predefined angles of arrival for the wireless devices belonging to the plurality of wireless devices;
the controller is operable to select an angle corresponding with the highest likelihood for wireless devices belonging to the plurality of wireless devices as the angle of arrival;
the controller is operable to determine an aggregate likelihood for predefined angles of orientation; and
the controller is operable to select an angle with the highest likelihood.

14. The apparatus set forth in claim 11, the controller is further operable to determine an elevation tilt angle between the wireless device whose orientation is to be determined and wireless devices associated with the plurality of wireless devices.

15. The apparatus set forth in claim 11, the controller is further operable to generate a heat map for a predefined grid around the wireless device, the heat map comprises data representative of phase angles for a signal received from points on the grid for a plurality of antennas associated with the wireless device; and
the controller is operable to compare a phase difference from the signal received from a wireless device whose orientation is to be determined with the heat map to determine the angle of arrival of the signal.

16. The apparatus set forth in claim 11, the controller is further operable to generate a heat map for a predefined grid around the wireless device, the heat map comprises data representative of phase angles for a signal received from points on the grid for a plurality of antennas associated with the wireless device;
the controller is operable to determine a likelihood that a signal came from a predefined grid point for the grid points in the heat map; and
the controller is operable to select the angle of arrival corresponding to the grid point with the highest likelihood.

17. A method, comprising:
obtaining data representative of respective locations for a plurality of wireless devices;
obtaining data representative of respective actual angles between a wireless device whose orientation is to be determined and wireless devices belonging to the plurality of wireless devices;

obtaining data representative of an angle of arrival of a signal from the wireless device whose orientation is to be determined from wireless devices belonging to the plurality of wireless devices; and generating a heat map for a predefined grid around wireless devices belonging to the plurality of wireless device, the heat map comprises data representative of phase angles for a signal received from predefined points on the grid for a plurality of antennas associated with the wireless devices belonging to the plurality of wireless devices;

determining a likelihood that a signal came from predefined angles of arrival for the wireless devices belonging to the plurality of wireless devices;

determining, by a processor, an aggregate likelihood for predefined angles of orientation; and selecting, by the processor, an angle with the highest likelihood as the angle of orientation.

18. The method set forth in claim 17, further comprising:
determining for a wireless device belonging to the plurality of wireless devices, a plurality of phase differences corresponding to a plurality of antenna pairs; and
wherein determining a likelihood that the signal came from predefined angles further comprises comparing, by the processor, the plurality of phase differences from the signal received from the wireless device whose orientation is to be determined with a plurality of phase differences in the heat map.

19. The method set forth in claim 17, wherein the predefined angles are one degree increments about the axis.

20. The method set forth in claim 17, wherein determining an aggregate comprises summing the likelihood for wireless devices belonging to the plurality of wireless devices for a predefined angle.

* * * * *